United States Patent

Hageman et al.

[11] Patent Number: 5,927,928
[45] Date of Patent: *Jul. 27, 1999

[54] WHEEL CHOCKING DEVICE

[75] Inventors: Martin P. Hageman, Mequon; Thomas J. Palus, Cedarburg, both of Wis.

[73] Assignee: Kelley Company, Inc., Mequon, Wis.

[*] Notice: This patent issued on a continued prosecution application filed under 37 CFR 1.53(d), and is subject to the twenty year patent term provisions of 35 U.S.C. 154(a)(2).

[21] Appl. No.: 09/107,373

[22] Filed: Jun. 30, 1998

[51] Int. Cl.$^6$ ..................................... B65G 67/02
[52] U.S. Cl. ..................... 414/401; 414/584; 188/32
[58] Field of Search ..................... 414/401, 396, 414/584; 188/32

[56] References Cited

U.S. PATENT DOCUMENTS

| | | | |
|---|---|---|---|
| 3,110,466 | 11/1963 | O'Sullivan | 248/119 |
| 3,305,049 | 2/1967 | Willey | 188/32 |
| 4,207,019 | 6/1980 | Cone | 188/32 |
| 4,969,792 | 11/1990 | Ellis et al. | 188/32 |
| 5,249,905 | 10/1993 | Warner et al. | 414/584 |
| 5,375,965 | 12/1994 | Springer et al. | 414/401 |
| 5,553,987 | 9/1996 | Ellis | 414/401 |
| 5,582,498 | 12/1996 | Springer et al. | 188/32 |
| 5,664,930 | 9/1997 | Ellis | 414/401 |
| 5,709,518 | 1/1998 | Alexander et al. | 414/401 |
| 5,762,459 | 6/1998 | Springer et al. | 188/32 |

*Primary Examiner*—James W. Keenan
*Assistant Examiner*—Isobel Parker
*Attorney, Agent, or Firm*—Michael Best & Friedrich LLP

[57] ABSTRACT

A loading dock having a dock face, a driveway positioned adjacent to the dock face, a wheel chock positioned above the driveway for movement relative to the driveway, and a power mechanism interconnected with the chock to provide power to the chock. The power mechanism is at least partially recessed within the driveway. Preferably, the power mechanism is spaced from the dock face so that vehicles having lift gates can be serviced under a variety of conditions. The power mechanism can be positioned within a housing that is also spaced from the dock face. The housing can include a ramped portion facing the dock face so that contact with the housing by a lift gate will be deflected.

18 Claims, 14 Drawing Sheets

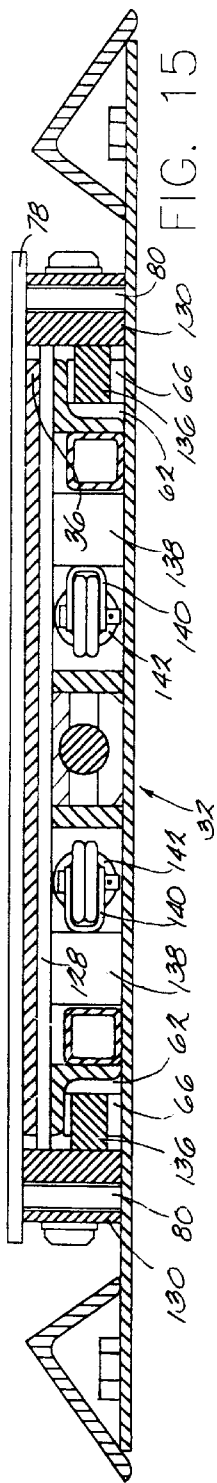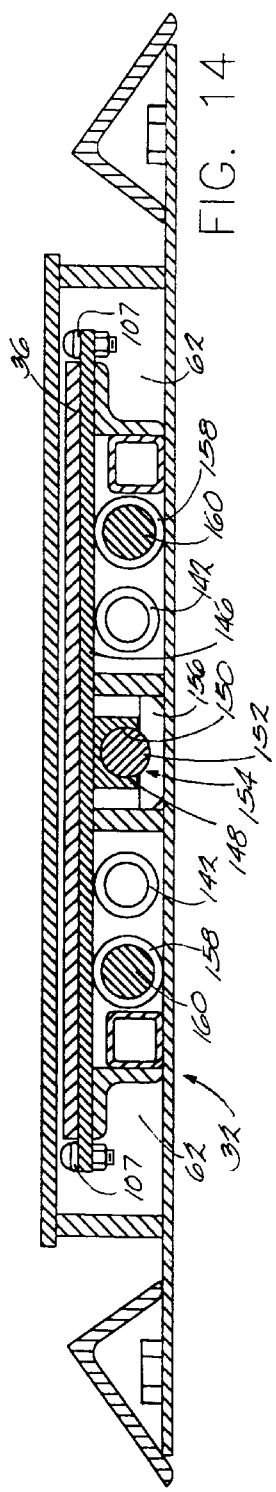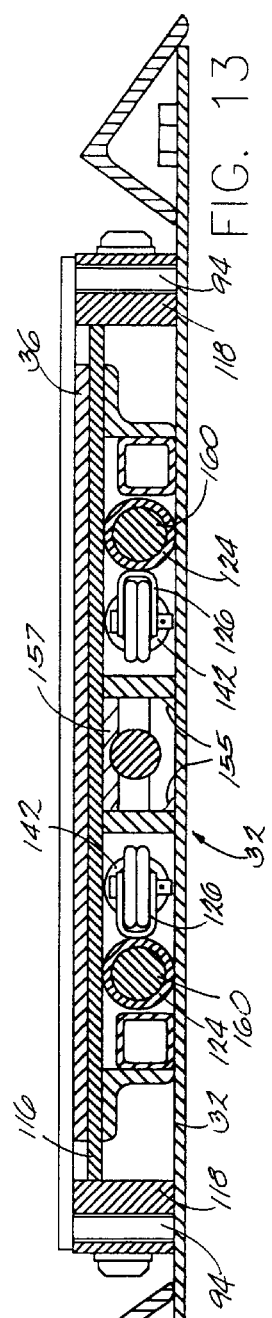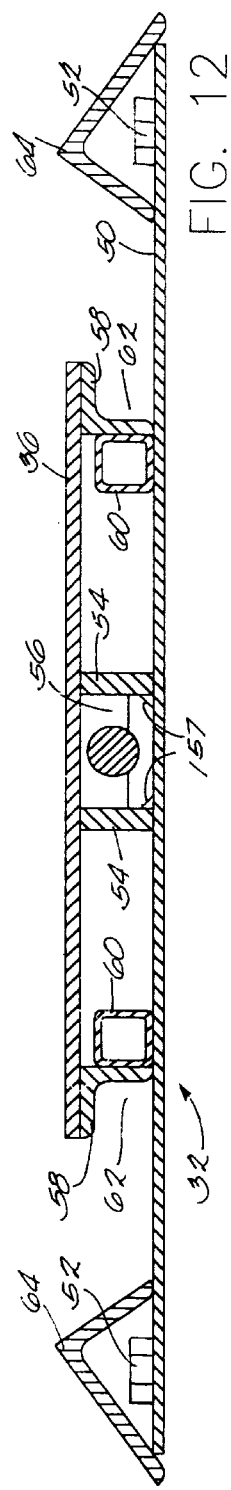

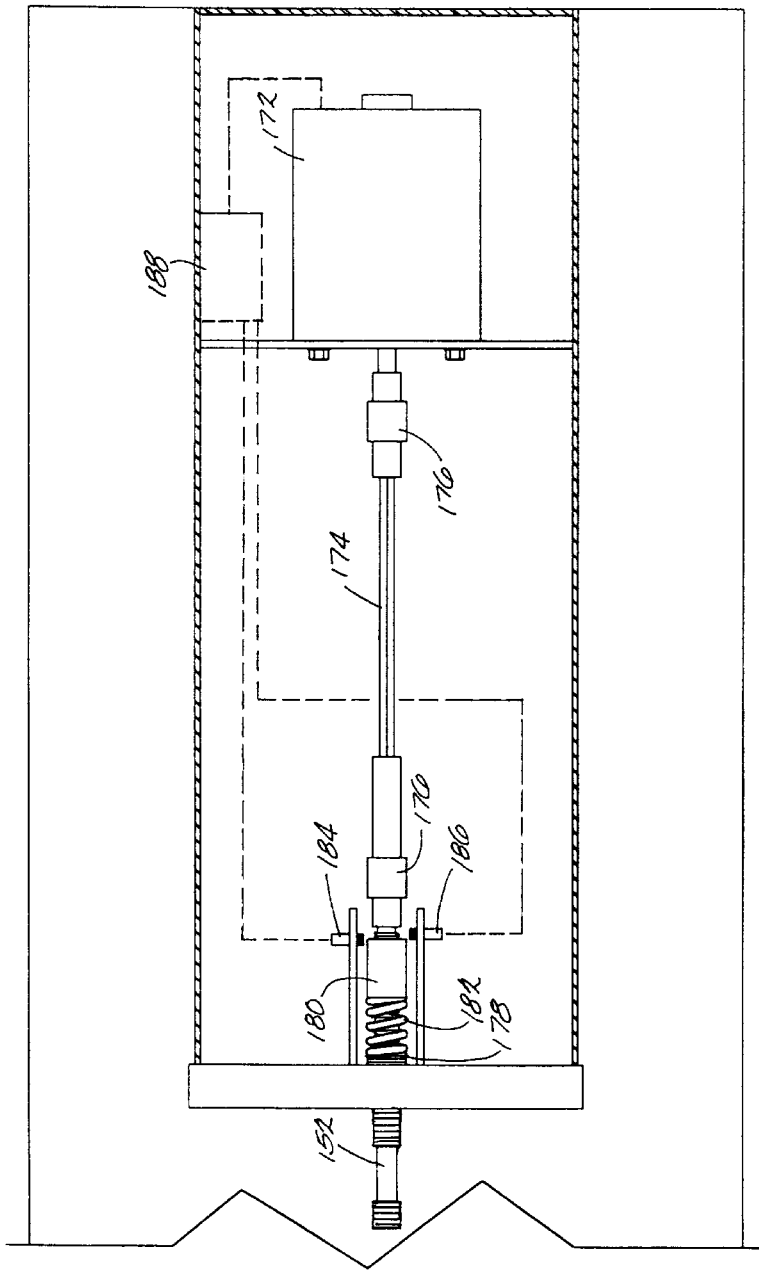
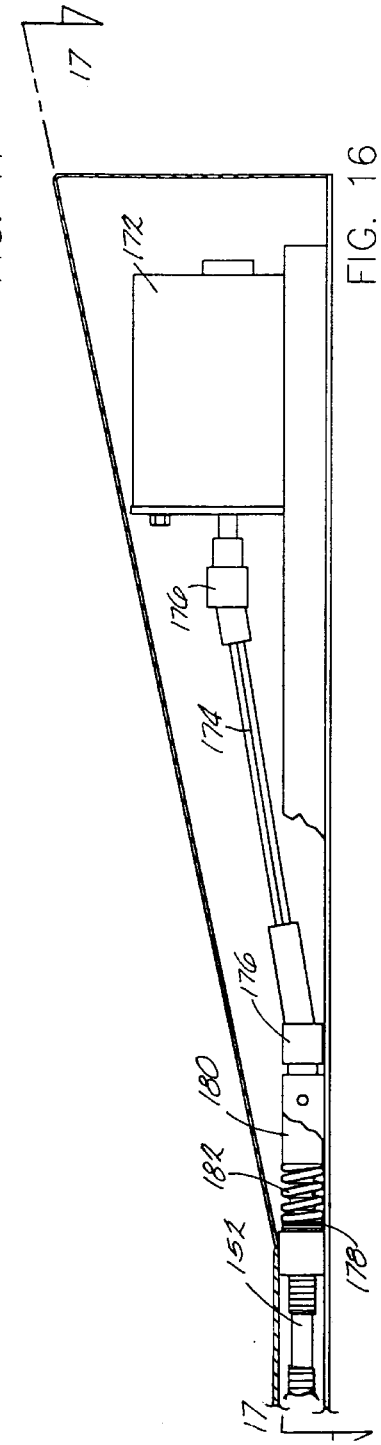

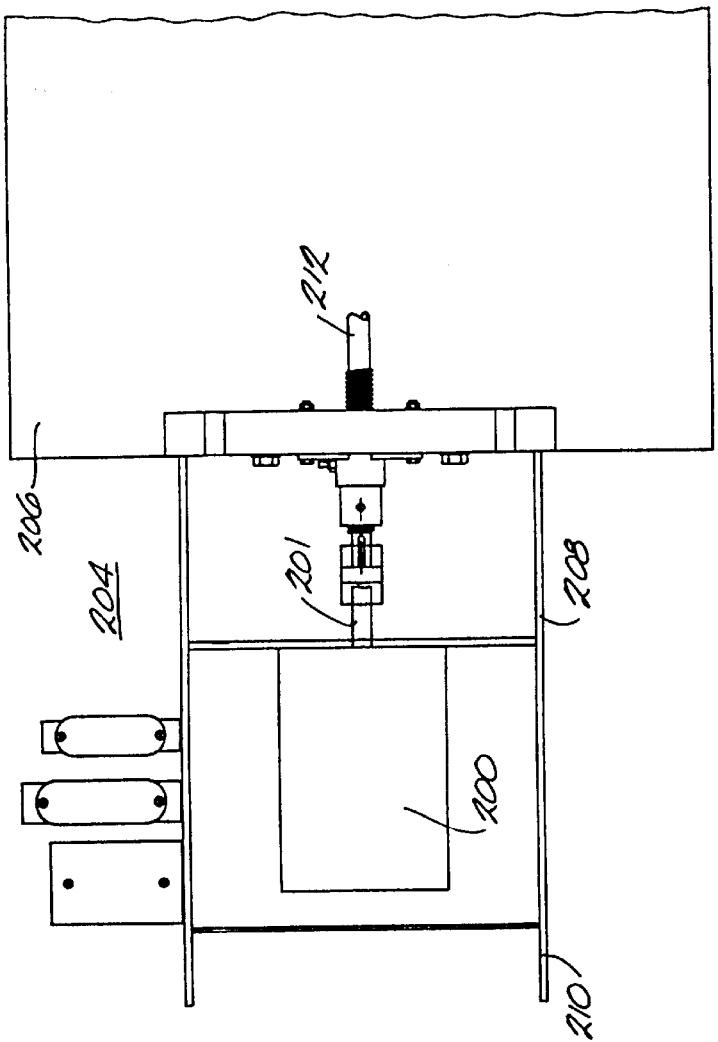
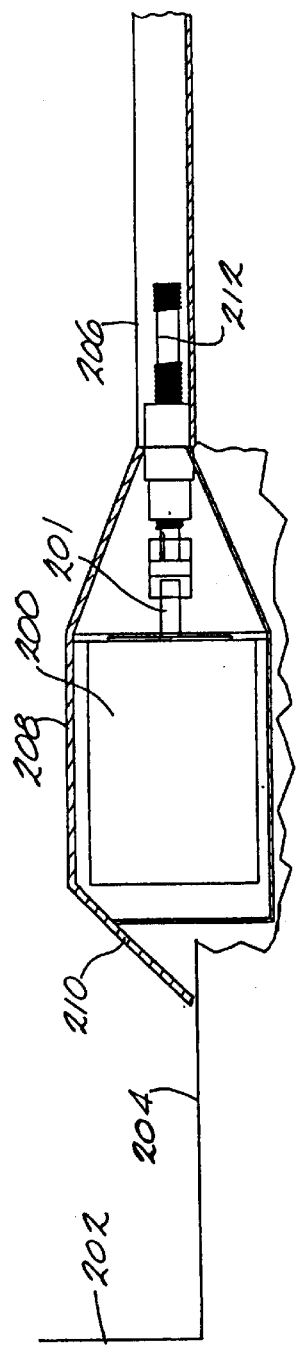

WHEEL CHOCKING DEVICE

FIELD OF THE INVENTION

The present invention generally relates to the field of vehicle restraining devices that prevent movement of a vehicle away from a desired location. More specifically, the present invention relates to powered wheel chocking devices.

BACKGROUND OF THE INVENTION

Powered wheel chocking devices have been developed to allow a vehicle (e.g., a straight truck, a trailer with or without a tractor, etc.) to be secured at a desired location (e.g., a loading dock) so that loading, unloading or other operations can be performed without risk that the vehicle will unexpectedly move away. Such wheel chocking devices typically include a chock that can be selectively moved by a drive mechanism between a chocked position and an unchocked position. These devices are commonly provided with visual and/or audible signals that indicate when the chock is in the chocked position and when the chock is in an unchecked position.

One type of powered wheel chocking device has been designed by Michel Roux, and is disclosed in European Patent Publication No. 537,075. The Roux device includes a chock that is movable between an unchecked lowered position and chocked raised position. The Roux device is designed to maintain the chock in a lowered position until the chock has been moved longitudinally into contact with the vehicle wheel. After contact with the vehicle wheel, further movement of the drive mechanism causes the chock to pivot to the raised position to secure the vehicle wheel.

A similar device is disclosed in U.S. Pat. No. 5,375,965 to Springer et al. The Springer device also includes a chock that is movable between lowered and raised positions, and the chock is designed to be moved longitudinally into contact with the vehicle wheel while the chock is in the lowered position. After contact with the wheel, the drive mechanism will continue to drive a portion of the chock until the chock moves to the raised position.

SUMMARY OF THE INVENTION

One problem with the above-described wheel chocking devices is that they cannot be used with certain types of vehicles. More specifically, the back end of certain vehicles have rail-type lift gates that are commonly used for loading and/or unloading without the use of a dock leveler. When it is desired to load and/or unload these types of vehicle from a loading dock having a dockleveler, the lift gate must be lowered to its lower-most position so that the dock leveler can be positioned on the bed of the vehicle. When in this lowered position, the lift gate is commonly less than a few inches from the ground. The position of the motors of the above-noted prior art devices can interfere with the proper positioning of the lift gate in its lowered position. When this occurs, the dockleveler cannot be used to load and/or unload the vehicle.

In addition, even if the prior art motors do not interfere with the lowering of the lift gate, the lift gate can damage the motor as the vehicle is driven away from the loading dock. This would be caused by the driver of the vehicle forgetting to raise the lift gate before pulling away form the loading dock. In this situation, the lift gate could collide with the motor and cause damage to the lift gate or motor.

The present invention alleviates the above-noted problems by recessing the power mechanism (e.g., motor) within the driveway upon which the wheel chock is mounted. Specifically, the present invention provides a loading dock having a dock face and a driveway positioned adjacent to the dock face. A wheel chock is positioned above the driveway for movement relative to the driveway, and a power mechanism is interconnected with the chock to provide power to the chock. In accordance with the present invention, the power mechanism is at least partially recessed within the driveway.

In one embodiment, the wheel chock is driven by a screw member. In this embodiment, the output shaft of the drive mechanism can be aligned with and directly coupled to the screw member, thereby eliminating the need for extra drive shafts and couplings.

Preferably, the power mechanism is spaced from the dock face so that vehicles having lift gates can be serviced under a variety of conditions. The power mechanism can be positioned within a housing that is also spaced from the dock face. The housing can include a ramped portion facing the dock face so that contact with the housing by a lift gate will be deflected.

BRIEF DESCRIPTION OF THE DRAWINGS

FIG. 12 is a section view taken along line 12—12 in FIG. 2.

FIG. 13 is a section view taken along line 13—13 in FIG. 2.

FIG. 14 is a section view taken along line 14—14 in FIG. 2.

FIG. 15 is a section view taken along line 15—15 in FIG. 2.

FIG. 16 is a side section view taken along line 16—16 in FIG. 1.

FIG. 17 is a top section view taken along line 17—17 in FIG. 16.

FIG. 18 is a side section view of an alternative embodiment of the present invention.

FIG. 19 is a top section view of the alternative embodiment of FIG. 18.

DETAILED DESCRIPTION

Figure 1:
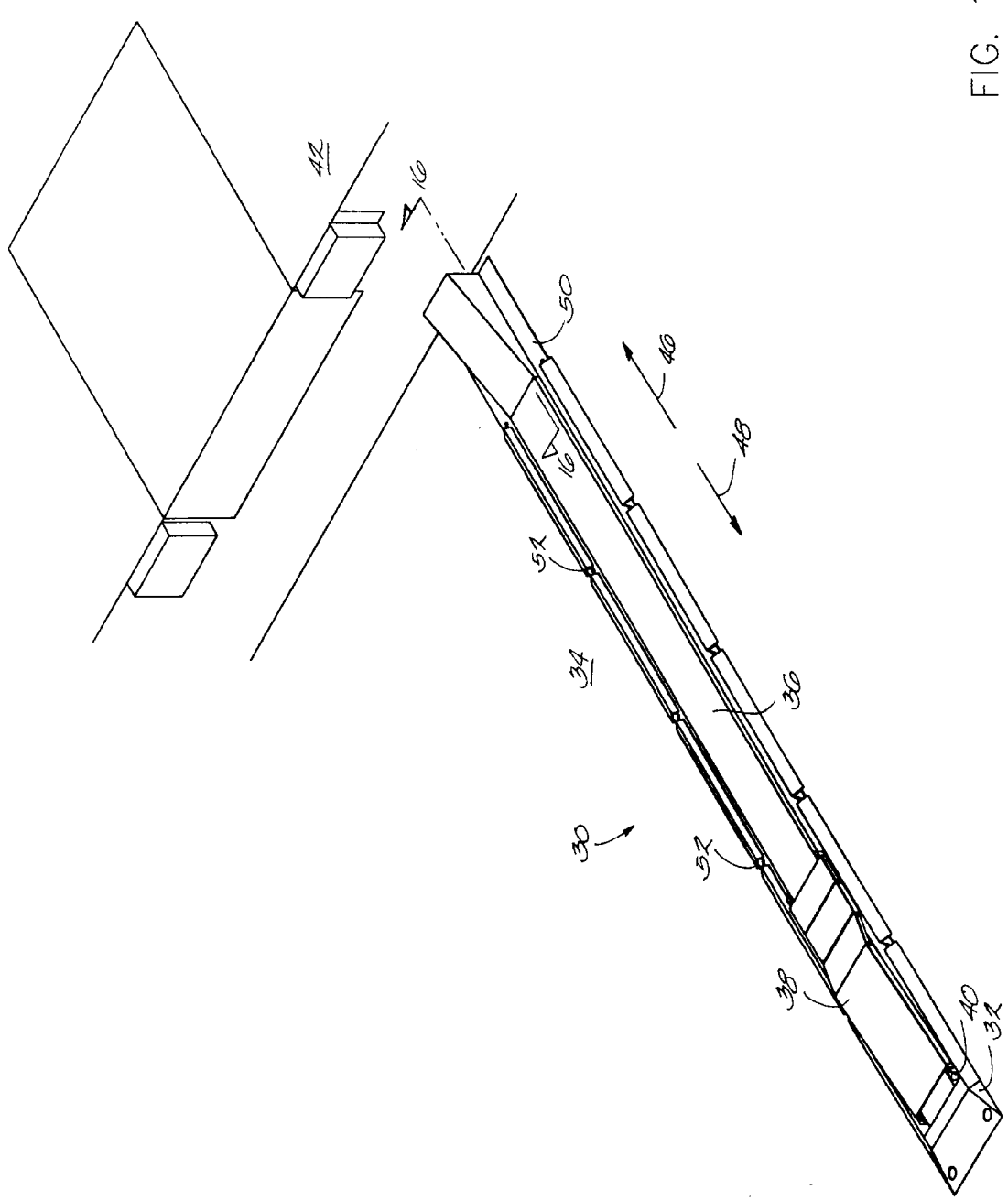
FIG. 1 is a perspective view of a wheel chocking device embodying the present invention and positioned at a loading dock.

The illustrated wheel chocking device 30 generally includes a base frame 32 adapted to be secured to an underlying driveway 34, a cover plate 36 covering the base frame 32, a chock 38 positioned over the cover plate 36 and adapted to slide relative to the base frame 32, and a drive mechanism 40 positioned substantially within the base frame 32 and under the cover plate 36. The wheel chocking device 30 is specifically designed to be positioned adjacent to a loading dock 42 so that a vehicle that is backed against the loading dock 42 can be secured in position adjacent to the loading dock 42. As used herein, the rearward direction denotes movement toward the loading dock 42 as represented by the arrow 46, and the frontward direction is opposite to the rearward direction as represented by the arrow 48.

Figure 2:
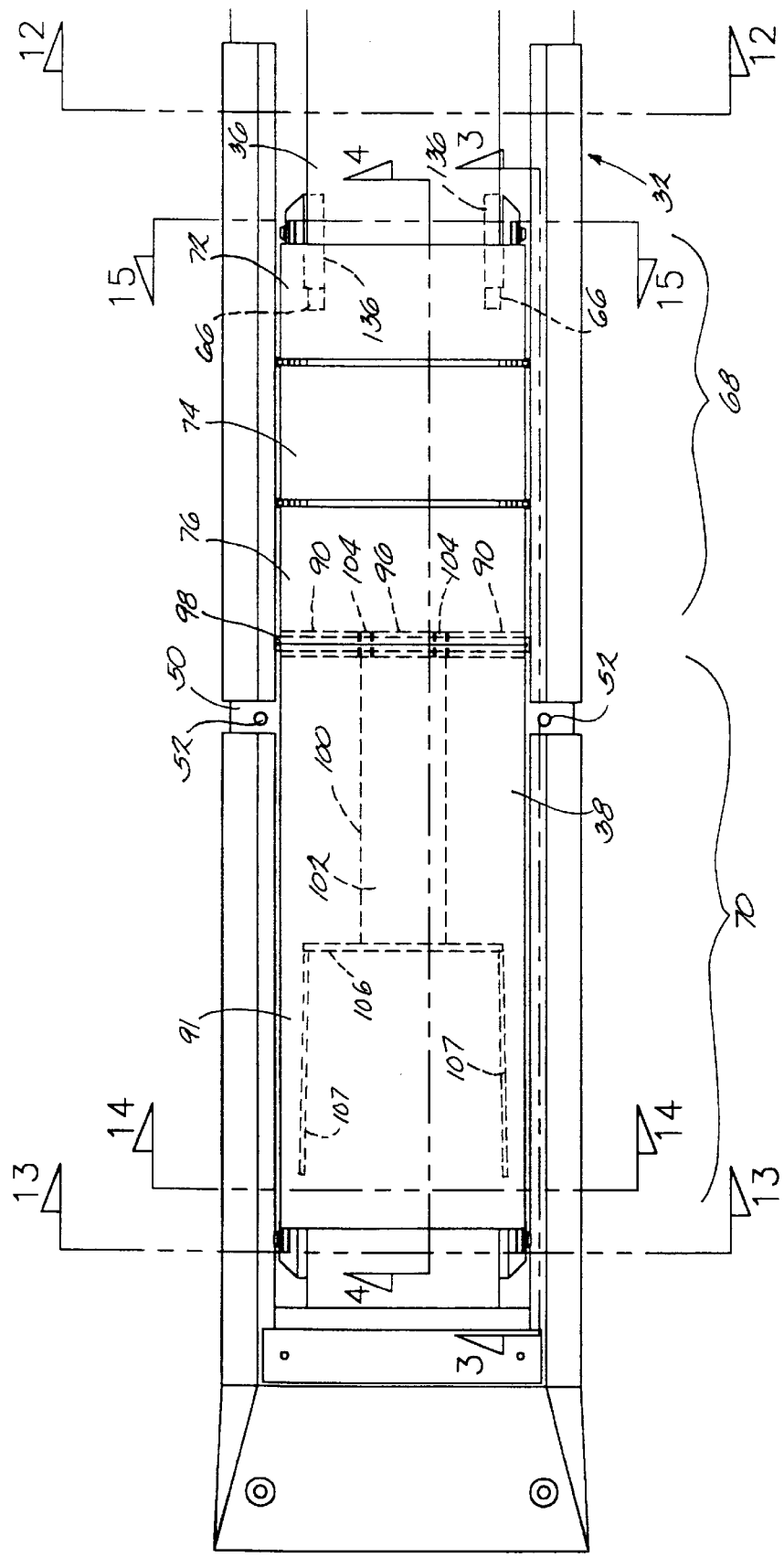
FIG. 2 is a partial top view of the wheel chocking device of FIG. 1.

Referring to FIGS. 1, 2 and 12, the base frame 32 includes a base plate 50 that is designed to be secured to the driveway 34 by a series of fasteners 52. For example, the illustrated base plate 50 is secured to a concrete or asphalt driveway in front of the loading dock 42. Referring specifically to FIG. 12, inner side walls 54 are secured to the base plate 50 and define a recess 56 therebetween for housing a portion of the drive mechanism 40, as described below in more detail. Outer side walls in the form of guide members 58 and support members 60 define side slots 62 for guiding the drive mechanism 40, as described below in more detail. The inner side walls 54 and guide members 58 cooperatively provide a non-securing support for the cover plate 36. That is, the cover plate 36 rests upon but is not secured to the inner side walls 54 and guide members 58. Side angles 64 are secured to the longitudinal edges of the base plate 50 to protect the wheel chocking device 30 from potential damage from snow plows and truck traffic. The side angles 64 could be made detachable (e.g., by attaching with bolts) from the base plate 50. The base plate 50 is further provided with stop blocks 66 (FIGS. 2 and 15) that stop movement of the drive mechanism 40 in the frontward direction, as described below in more detail.

The cover plate 36 extends along substantially the entire length of the base frame 32 to provide a protective cover for the drive mechanism 40. The cover plate 36 allows a vehicle 44 to drive on top of the wheel chocking device 30 without damaging any of the components of the drive mechanism 40. The cover plate 36 is secured to the base frame 32 only at its ends, and thus the middle portion of the cover plate 36 is allowed to move vertically away from the base frame 32 or "float" to allow portions of the drive mechanism 40 to pass between the base frame 32 and the cover plate 36. This allows the drive mechanism 40 to be interconnected with the chock 38.

Figure 3:
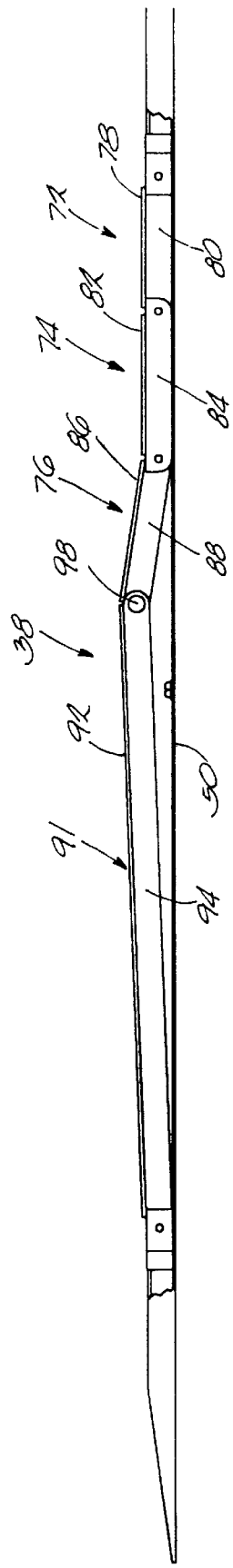
FIG. 3 is a section view taken along line 3—3 in FIG. 2.

Referring to FIGS. 2–8, the chock 38 generally includes a rear portion 68 adapted to engage a vehicle wheel 108, and a front portion 70 that is movably interconnected with and provides support to the rear portion 68. Referring specifically to FIGS. 2 and 3, the rear portion 68 comprises a series of three links: a lower link 72, a middle link 74 and an upper link 76. The lower link 72 includes a lower plate 78 and a lower side member 80 secured near each side of the lower plate 78 (see FIGS. 3 and 15). The middle link 74 includes a middle plate 82 and a middle side member 84 secured near each side of the middle plate 82 (FIG. 3). The middle side members 84 are pivotally connected to the lower side members 80. The upper link 76 comprises an upper plate 86 and an upper side member 88 secured near each side of the upper plate 86. The upper side members 88 are pivotally secured to the middle side members 84. Upper tube members 90 (FIGS. 2 and 4) are secured to the upper plate 86 to provide a location for securing the upper link 76 to the front portion 70 of the chock 38.

The front portion 70 of the chock 38 includes a single large link 91 comprising a large plate 92 and a large side member 94 secured near each side of the large plate 92 (FIG. 3). A front tube member 96 (FIG. 2) is secured to the large plate 92 in alignment with the upper tube members 90. The front tube member 96 and upper tube members 90 are designed to receive a pin member 98 for pivotally securing the large link 91 with the upper link 76.

A support link 100 is pivotally connected to the pin member 98 (FIGS. 2 and 4–8). The support link 100 includes a support plate 102 and two hinge members 104 secured to the outboard ends of the support plate 102. The hinge members 104 are positioned between the upper tube members 90 and the front tube member 96 and are designed to receive the pin member 98 so that the support link 100 is pivotally attached to the pin member 98. A cross member 106 is secured to the other end of the support plate 102 to provided a more stable footing for the support link 100 when it engages the cover plate 36, as described below in more detail. The cross member 106 also provides an attachment point for two link members 107. In the illustrated embodiment, the link members 107 are made from a flexible material, such as chain, and their function is described below in more detail.

Figure 4:
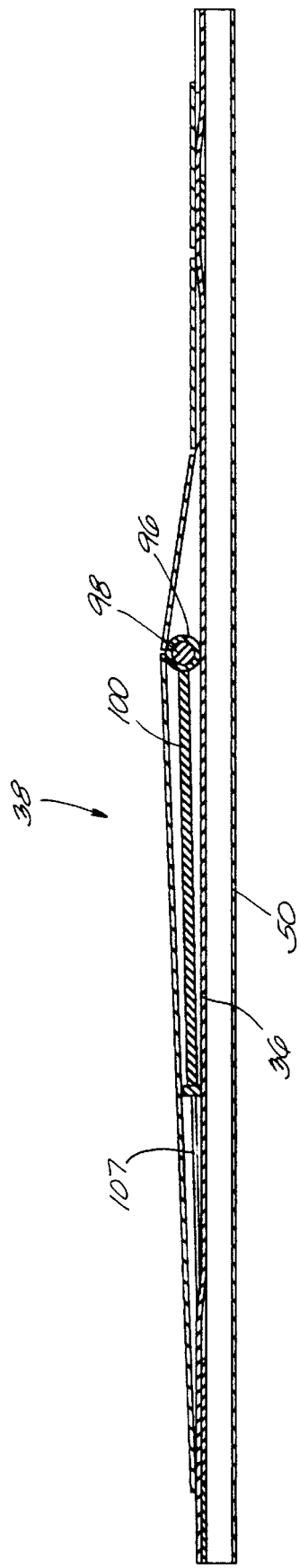
FIG. 4 is a schematic section view taken along line 4—4 in FIG. 2 with the chock in a lowered position.
Figure 5:
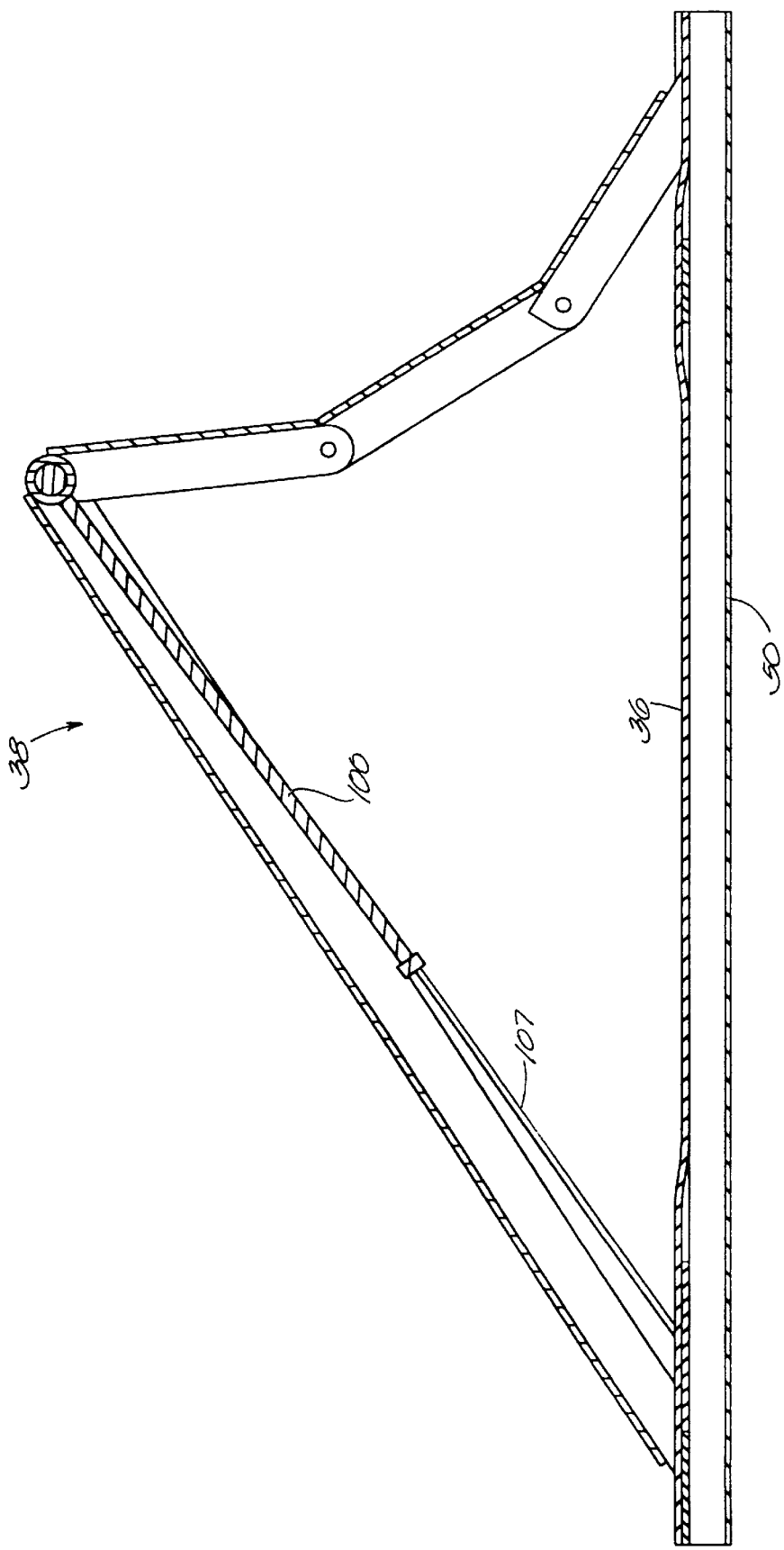
FIG. 5 is the section view of FIG. 4 with the chock in a raised position.
Figure 6:
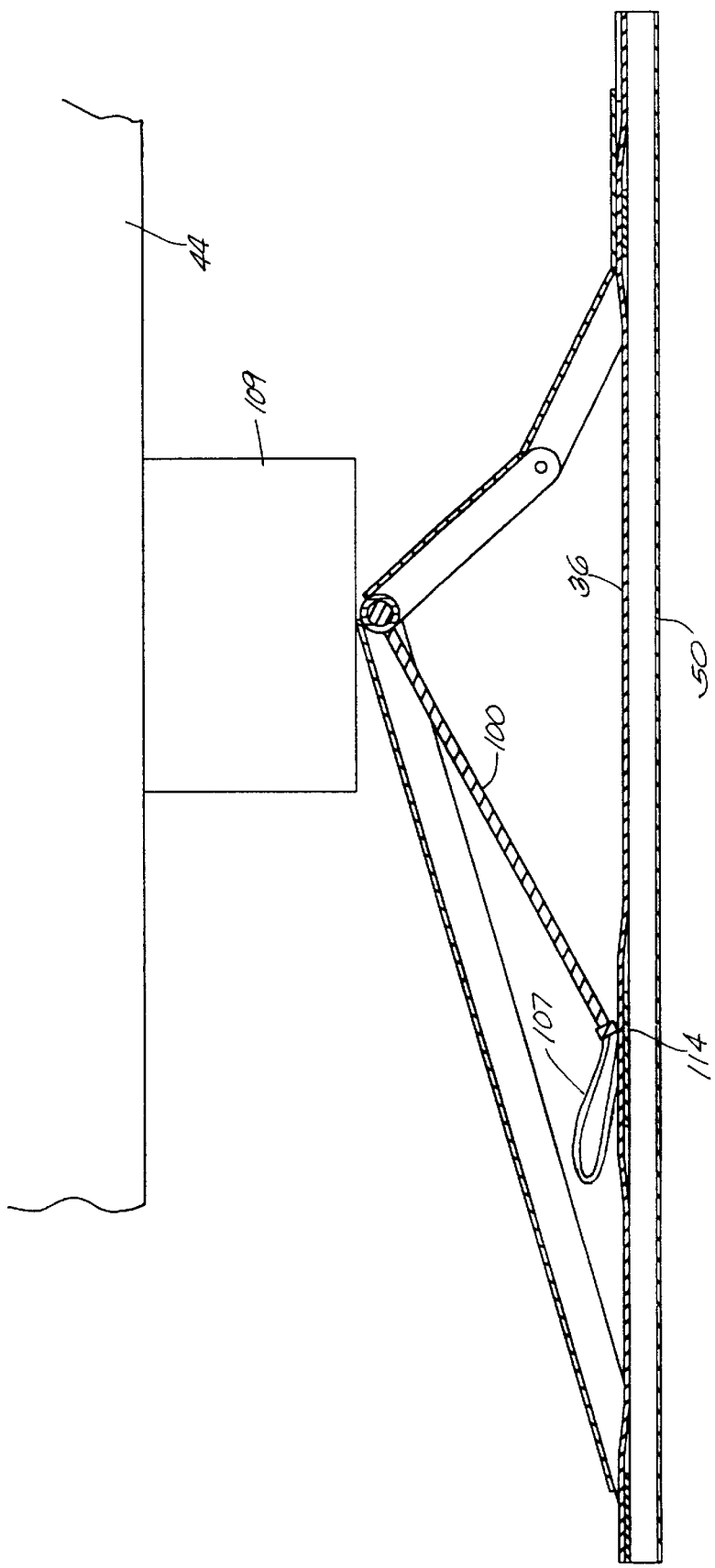
FIG. 6 is the section view of FIG. 4 with the chock in an intermediate position deflecting around an obstruction.
Figure 8:
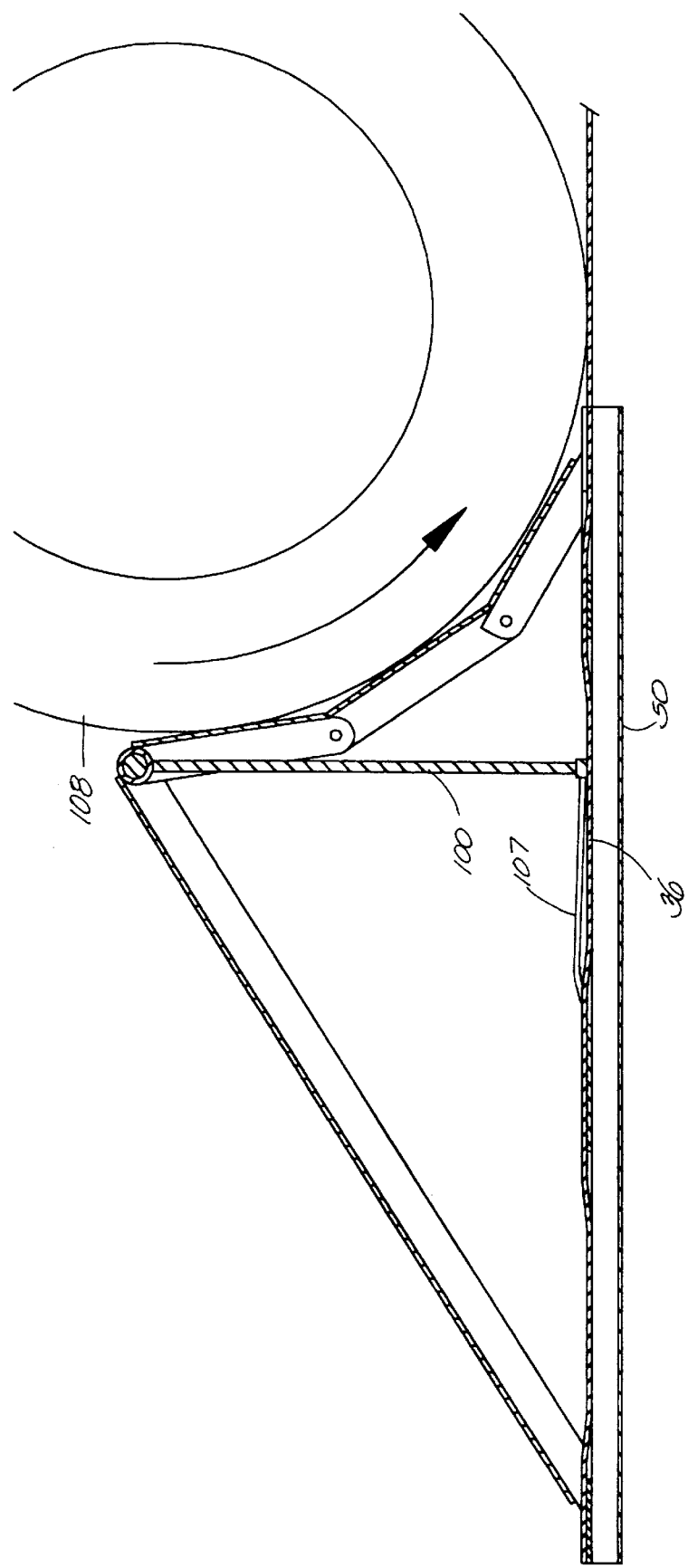
FIG. 8 is the section view of FIG. 4 illustrating the action of the chock when the vehicle wheel is driven.

The above-described chock 38 is designed to slide longitudinally (i.e., in the frontward and rearward directions) relative to the base frame 32 and cover plate 36. Such sliding motion allows the chock 38 to be moved into contact with a vehicle wheel 108 positioned on the cover plate 36. More specifically, the chock 38 can be moved from a stored position (FIGS. 3 and 4) to a raised and unsupported position (FIG. 5). When the chock is in the unsupported position, the support link 100 does not support the chock 38. In this unsupported position, the chock 38 is designed to have the ability to deflect around an obstruction 109 hanging down from the vehicle 44 (FIG. 6). Once the raised chock 38 is brought into contact with the vehicle wheel 108, the support link 100 will move to a supporting position in a manner described below in more detail. In the supporting position, the support link 100 will prevent the chock 38 from deflecting downward in the event that the vehicle attempts to drive away from the loading dock (FIG. 8).

The chock 38 is moved and raised by the drive mechanism 40. The drive mechanism 40 is best shown in FIGS. 9–15, and includes, inter alia, a front slider 110, a rear slider 112, and a drive member 114.

Figure 9:
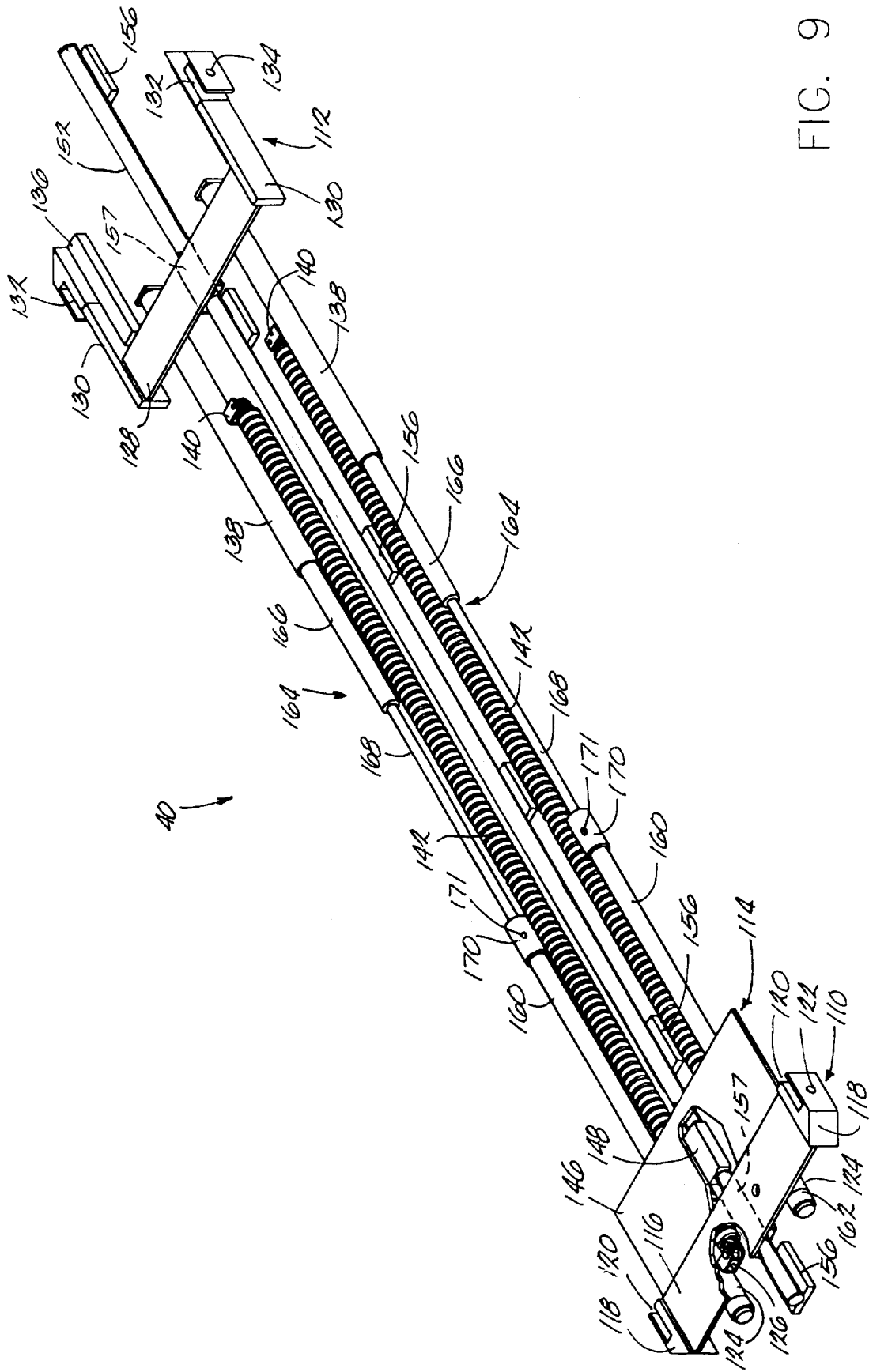
FIG. 9 is a perspective view of the interior components of the chock when the chock is in the lowered position.

The front slider 110 comprises a front plate 116 slidably positioned between the base frame 32 and the cover plate 36 (FIGS. 9 and 13). A front block 118 is secured to each side edge of the front plate 116. Each front block 118 includes a front slot 120 and a front hole 122 for facilitating pivotal engagement with the large side members 94 of the link (see FIGS. 2, 3 and 13). The front slider 110 further includes two front tubes 124 secured to the bottom surface of the front plate 116, and a front spring bracket 126 secured to each front tube 124. Because of the pivotal engagement between the front slider 110 and the large link 91, it can be seen that movement of the front slider 110 will result in movement of the front end of the large link 91.

The rear slider 112 includes a rear plate 128 slidably positioned between the base frame 32 and the cover plate 36 (FIGS. 9 and 15). A rear block 130 is secured to each side edge of the rear plate 128. Each rear block 130 includes a rear slot 132 and a rear hole 134 for facilitating pivotal engagement with the lower side members 80 of the lower link. Each rear block 130 is provided with a bar member 136 positioned within the side slots 62 formed by the guide members 58 of the base frame 32 (FIGS. 2 and 15). The bar members 136 provide guidance to the rear slider 112 and prevent the rear slider 112 from moving upwardly away from the base frame 32. The bar members 136 further provide a means for stopping movement of the rear slider 112 in the frontward direction. More specifically, the bar members 136 will contact the stop blocks 66 of the base frame 32 to stop the rear slider 112 in the stored position (see FIG. 2). The rear slider 112 further includes two spring tubes 138 secured to the bottom surface of the rear plate 128, and a rear spring bracket 140 secured to each spring tube.

The front slider 11Q and rear slider 112 are interconnected by two coil springs 142 secured on one end to the front spring brackets 126 and on the other end to the rear spring brackets 140 (FIG. 9). The coil springs 142 provide a biasing force tending to pull the front slider 110 and rear slider 112 toward each other. Such movement of the front slider 110 and rear slider 112 toward each other will result in the chock 38 moving to the raised position. Thus, the chock 38 is biased to the raised position.

The drive member 114 is operatively positioned between the front slider 110 and the rear slider 112. The drive member 114 is designed to drive the rear slider 112 when the chock 38 is being moved in the rearward direction, and is designed to drive the front slider 110 when the chock 38 is being moved in the frontward direction. The drive member 114 comprises a drive plate 146 slidably positioned between the base frame 32 and the cover plate 36, and a drive block 148 secured to the. bottom surface of the drive plate 146 (FIGS. 9 and 14). The drive block 148 includes internal threads 150 for threadedly engaging a screw member 152. The drive block 148 includes an open portion 154 such that the internal threads 150 do not engage the entire outer circumference of the screw member 152.

Figure 10:
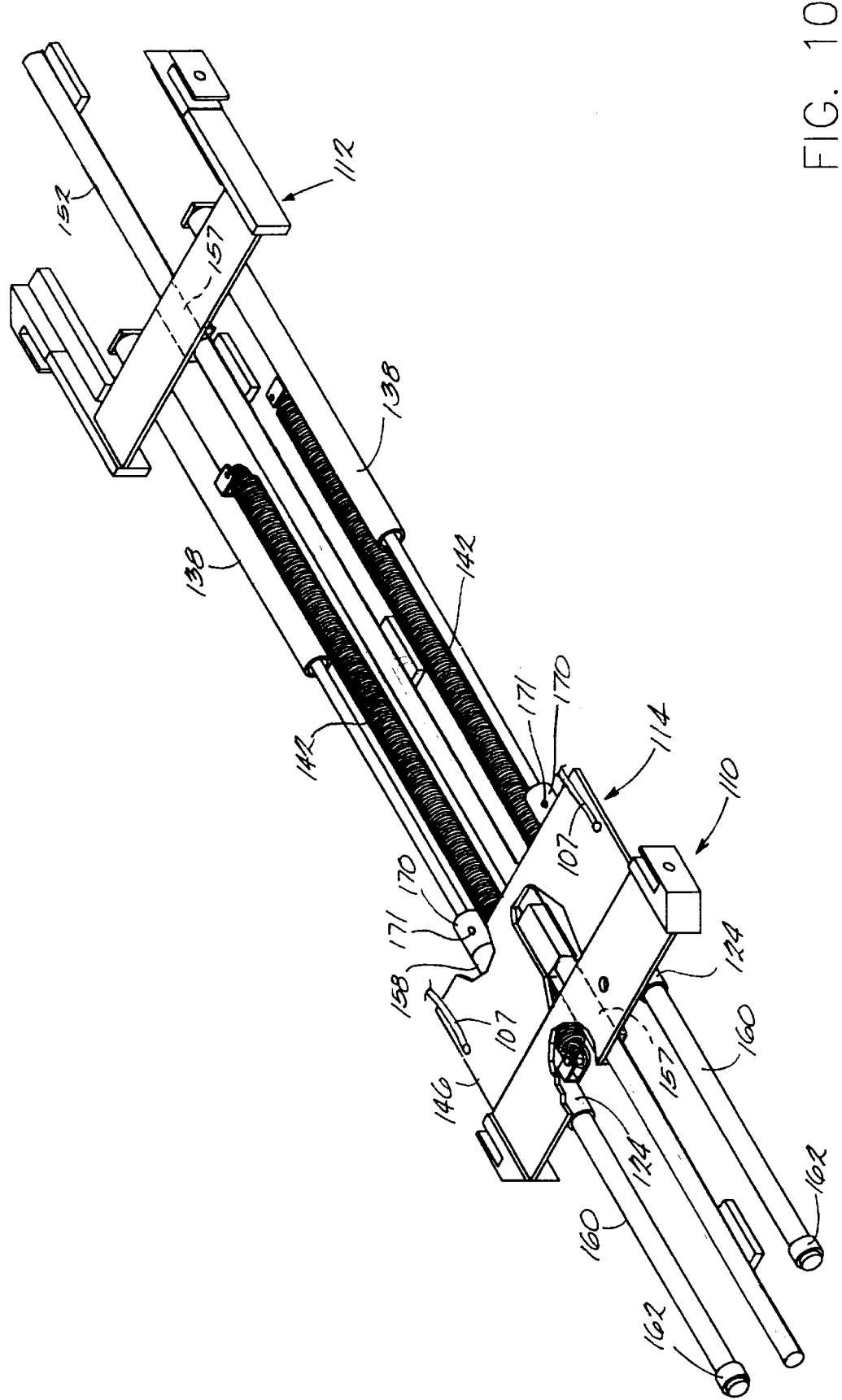
FIG. 10 is the perspective view of FIG. 9 with the chock in a raised position.
Figure 11:
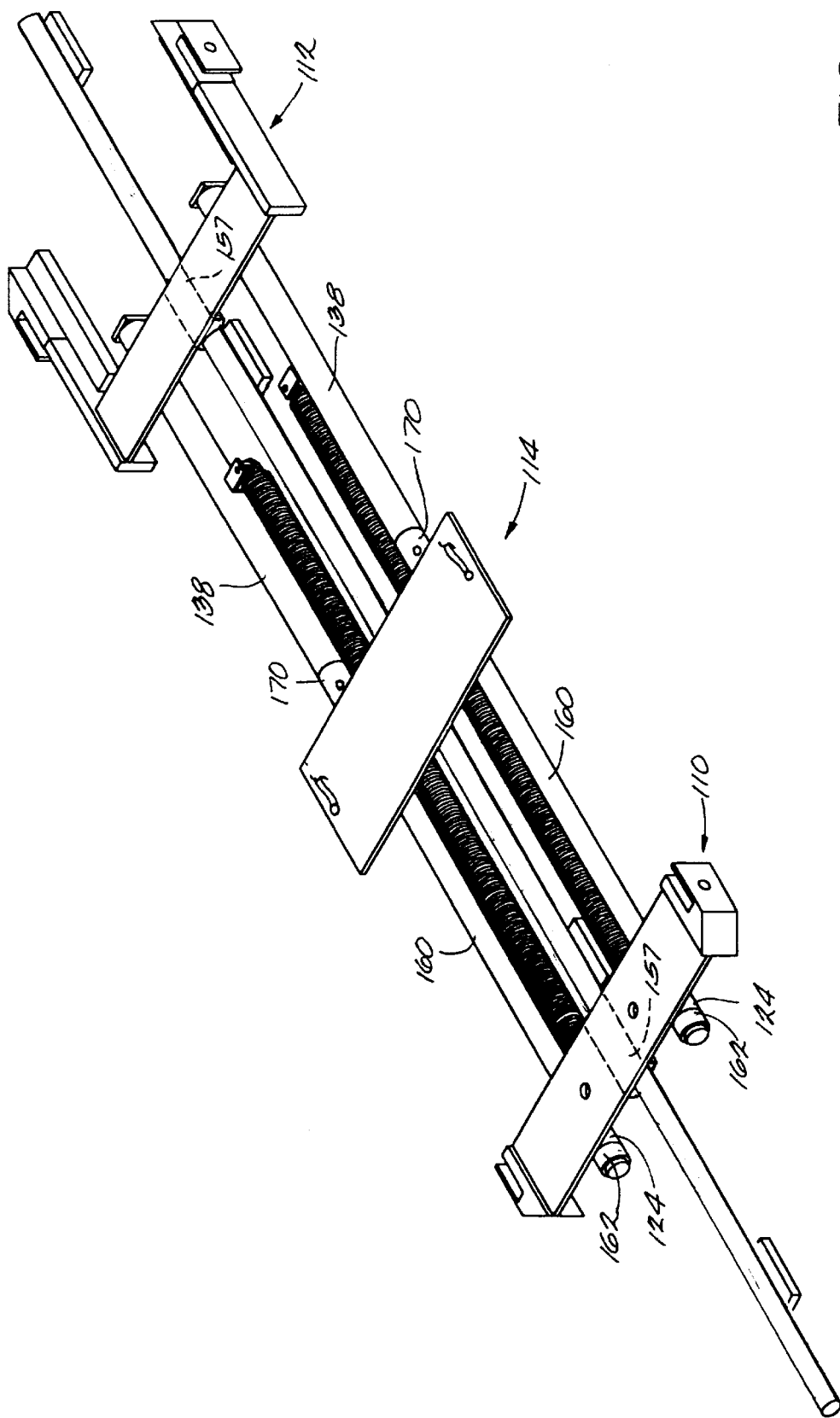
FIG. 11 is the perspective view of FIG. 9 with the chock in a raised and supported position.

The open portion 154 of the drive block 148 allows an arcuate segment of the screw member 152 to be supported by a series of lower screw supports 156 spaced along the longitudinal length of the screw member 152. In a preferred embodiment, the longitudinal position of the lower screw supports 156 is limited by a plurality of spaced weld beads 155 (FIGS. 12–15) between the base plate 50 and the side walls 54. Upper screw supports 157 are secured to each of the front plate 116 and the rear plate 128 (FIGS. 9–15). In addition, a full screw support 159 is provided near the drive mechanism (FIGS. 11 and 19). The screw supports 156,157, 159 are preferably made from a low friction material (e.g., brass, plastic, etc.) to provide low friction engagement with the screw member 152. In the illustrated embodiment, the screw supports are made from a polymer material, such as ultra high molecular weight polyethylene. It has been found that the upper screw supports 157 are optional, and can be removed without significantly affecting the operation of the device.

The drive member 114 further includes two drive tubes 158 (FIGS. 10 and 14) secured to the bottom surface of the drive plate 146. The drive tubes 158 are positioned in alignment with the front tubes 124 on the front slider 110. The drive tubes 158 and front tubes 124 slidably receive a rod 160 having collars 162 that prevent the rod 160 from sliding out of the tubes. A gas spring 164 is operatively positioned between each rod 160 and the corresponding spring tube 138 of the rear slider 112. Each gas spring 164 includes a cylinder 166 (FIG. 9) slidably positioned within the corresponding spring tube, and a piston rod 168 secured to the corresponding rod 160 by a coupling 170 and set screw 171. In the illustrated embodiment, the piston rod 168 is biased away from the cylinder 166 at a force greater than the force of the fully-extended springs 142. The link members 107 are secured to opposing sides of the drive member 114, and are designed to control the position of the support link 100 in relation to the position of the drive member 114.

The above-described components of the drive mechanism 40 operate in the following manner to provide movement to the chock 38. In the stored position, the drive member 114 pushes the front slider 110 all the way to the front end of the base frame 32 (FIGS. 4 and 9). In this position, the rear slider 112 is held in spaced relation to the front slider 110 by the stop blocks 66 interacting with the bar members 136 (FIG. 2). In the stored position, the coil springs 142 are stretched, and the cylinder 166 of the gas spring 164 is partially pulled out of the spring tubes 138. The support link 100 is held in a non-supporting position by the link members 107.

Movement of the device is initiated by rotating the screw member 152, which results in movement of the drive member 114 in the rearward direction. Due to the biasing force of the coil springs 142, the front slider 110 will follow the rearward movement of the drive member 114, thereby resulting in moving of the chock to a raised position (FIGS. 5 and 10). At this point, the tubes 158 on the drive member 114 contact the couplings 170, and the cylinders 166 are bottomed out on plates 139 at the end of the spring tubes 138. Further movement of the drive member 114 therefore results in driving of the rear slider 112 in the rearward direction. The support link 100 is held in a non-supporting position by the link members 107 (FIG. 5).

If the raised chock encounters an obstruction 109 while moving rearwardly toward the wheel, the chock will deflect around the obstruction 109 and will subsequently return to the raised position after the obstruction 109 has been passed (FIG. 6). Such downward deflection of the chock is facilitated by the compliant biasing of the front slider 110 toward the rear slider 112, and further by the fact that the rear slider 112 is being driven. More specifically, if an obstruction 109 is encountered, the rear slider 112 will continue to be driven rearwardly, and the front slider 110 is allowed to slide forwardly, if necessary, to allow the chock to deflect downwardly to an intermediate position. Because the support link 100 is in a non-supporting position, the support link 100 does not interfere with the downward deflection of the chock. Furthermore, the flexible nature of the illustrated link members 107 allows the drive member 114 to move relative to the support link 100. Rather than have the wheel chock contact the obstruction, the wheel chock could be provided with a proximity sensor that senses the presence of an obstruction. If an obstruction is sensed, then the chock could be automatically lowered to a height lower than the obstruction (e.g., using a powered lowering means, such as an electric motor) until the obstruction is passed.

Figure 7:
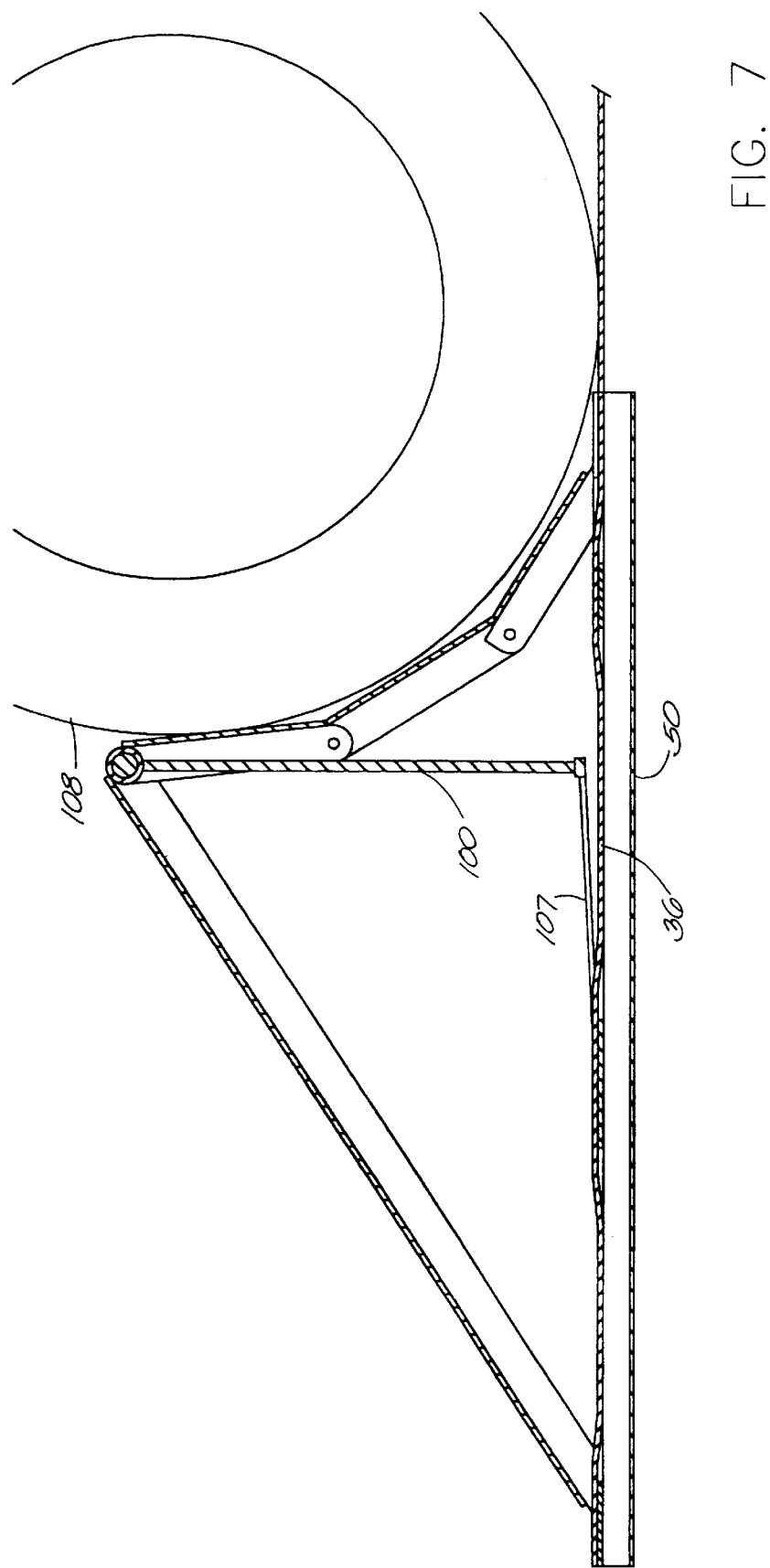
FIG. 7 is the section view of FIG. 4 with the chock in a raised and supported position at a vehicle wheel.

Once the vehicle wheel 108 has been engaged by the chock, the rear slider 112 will stop, but the drive member 114 will continue rearward movement until the collars 162 of the rods 160 engage the front tubes 124 and couplings 170 engage the spring tubes 138 (FIGS. 7 and 11). On vehicles with large radius wheels, the collars 162 could contact the front tubes 124 before the couplings 170 contact the spring tubes 138. Such movement of the drive member 114 results in the support link 100 moving to the supporting position, thereby placing the chock 38 in the raised and supported position.

Movement of the chock 38 back to the stored position is accomplished in substantially the reverse order. It is noted, however, that movement of the chock 38 in the frontward direction is accomplished by driving the front slider 110. In this manner, the chock 38 will be allowed to deflect downwardly to an intermediate position to avoid any obstructions that may be encountered when moving the chock 38 back to the stored position.

The illustrated screw member 152 is driven by a power mechanism in the form of an electric motor 172 interconnected with the screw member 152 by a drive shaft 174 (FIGS. 16 and 17). The drive shaft 174 includes flexible couplings 176 for accommodating misalignment of the motor shaft with the screw member 152 (only one end is shown). The screw member 152 is slidably mounted within screw bushings 178 positioned on either end of the screw member 152. That is, the screw member 152 is supported by, but is not axially restrained by the screw bushings 178. Each end of the screw member 152 is provided with a screw collar 180 secured to the screw member 152, and a biasing spring 182 positioned between the screw bushing and the screw collar 180. In this manner, the screw member 152 is biased to a neutral position (FIG. 17) relative to the screw bushings 178.

A sensing mechanism is provided for sensing the axial position of the screw member 152. In the illustrated embodiment, the sensing mechanism includes a first sensor 184 positioned in alignment with the screw collar 180 when the screw member 152 is in a neutral position, and a second sensor 186 positioned to detect movement of the screw member 152 in the rearward direction. When the screw member 152 is being used to move the chock in either direction, the screw member 152 is positioned in the neutral position. When the chock has engaged a vehicle wheel, the screw member 152 will move frontwardly due to the resistance encountered by the drive member 114. Such frontward movement of the screw member 152 will be detected by the first sensor 184. Conversely, when the chock is in the stored position, the screw member 152 will move rearwardly due to the resistance encountered by the bar members 136 on the stop blocks 66. Such rearward movement of the screw member 152 will be detected by the second sensor 186. Information regarding the axial position of the screw member 152 can be provided to a control mechanism 188 (shown schematically in FIG. 17) and used to selectively disengage the power drive mechanism. More specifically, when the screw member 152 moves rearwardly, it is an indication that the stored position has been reached and the motor can be deactivated. Conversely, frontward movement of the screw member 152 indicates that a wheel has been engaged and the motor can be deactivated.

Alternatively, the power mechanism can be provided with a torque-limiting device, such as a torque or current sensor, to deactivate the power mechanism. As another alternative, a proximity sensor can be used to sense when the drive member 114 is in the stored position (FIGS. 3, 4 and 9). The use of a proximity sensor is advantageous in that it is a positional sensor that directly measures the position of the front slider 110, as opposed to a conditional sensor that measures a certain condition of the drive mechanism and infers the position of the chock.

The above-noted mechanisms for sensing the position of the wheel chock can be used to provide signals to a communication system. For example, the loading dock can be provided with a dock lighting system for communicating with the dock workers and a driver lighting system for communicating with the driver of the vehicle. Each lighting system can include a red light and a green light. When the chock is in the stored position, the driver lighting system will show a green light, indicating that the driver can enter or exit the loading dock, and the dock lighting system will show a red light, indicating that no loading or unloading operations should be performed. After the vehicle is positioned at the dock and the chock is activated to move toward the wheel of the vehicle, both lighting systems will show a red light and an audible warning can be provided to indicate that the chock is being moved. After the chock is secured at the vehicle wheel, the dock lighting system will show a green light indicating that loading and unloading operations can be performed, and the driver lighting system will remain red, indicating that the vehicle is secured and that the driver should not attempt to pull away from the dock. After loading and unloading operations are complete, the chock is moved back toward the stored position, during which time both lighting systems will show a red light and an audible warning will indicate that the chock is being moved.

An alternative embodiment of the present invention is illustrated in FIGS. 18–19. The alternative embodiment is similar to the embodiment illustrated in FIGS. 1–17, except that the power mechanism (e.g., motor 200 having an output shaft 201) is spaced from the dock face 202 and recessed at least partially within the driveway 204 upon which the wheel chocking device 206 is positioned. The power mechanism can be positioned within a drive housing 208 having a ramped portion 210.

With this configuration, the motor 200 (e.g., an electric motor) can be substantially aligned with and directly coupled to the screw member 212, without the need for the drive shaft 174 and flexible couplings 176 illustrated in FIGS. 16 and 17. Furthermore, by virtue of the spacing between the motor 200 and the dock face 202, a vehicle with a lift gate can lower the lift gate all the way to the driveway 204, if necessary, without interference with the motor 200. If the vehicle should pull away from the loading dock without raising the lowered lift gate, the ramped portion 210 of the housing 208 will deflect a lift gate upward, thereby avoiding damage to the wheel chocking device.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A loading dock comprising:
   a dock face;
   a driveway positioned adjacent to said dock face;
   a chock movable relative to said driveway from a stored position to a raised position, said chock being positioned above said driveway when in the stored position;
   a power mechanism interconnected with said chock to provide power to said chock, said power mechanism being at least partially recessed within said driveway; and
   a drive mechanism interconnecting said power mechanism with said chock, wherein said drive mechanism is positioned above said driveway.

2. A loading dock as claimed in claim 1, wherein said chock is movable from a lowered inoperative position to a raised operative position.

3. A loading dock as claimed in claim 2, wherein said chock is positioned above said driveway when in both the inoperative position and the operative position.

4. A loading dock as claimed in claim 1, further comprising a base frame positioned on said driveway, wherein said chock is positioned for movement over said base frame, and wherein said drive mechanism is at least partially positioned within said base frame such that wheels of a vehicle positioned at said loading dock will be positioned over at least a portion of said drive mechanism.

5. A loading dock as claimed in claim 1, wherein said drive mechanism includes a screw member, wherein said power mechanism includes a motor having an output shaft, and wherein said screw member is aligned with said output shaft.

6. A loading dock as claimed in claim 1, wherein said motor comprises an electric motor.

7. A loading dock as claimed in claim 1, wherein said power mechanism is spaced from said dock face.

8. A loading dock as claimed in claim 1, further comprising a housing in which said power mechanism is positioned.

9. A loading dock as claimed in claim 8, wherein said housing is spaced from said dock face.

10. A loading dock as claimed in claim 8, wherein said housing includes a ramped portion facing said dock face.

11. A loading dock comprising:

a dock face;

a driveway positioned adjacent to said dock face;

a chock movable from a lowered position where a vehicle wheel is capable of going on and over said chock to a raised position where said chock is able to prevent rotation of the vehicle wheel when said chock is placed against the vehicle wheel, said chock being movable relative to said driveway and positioned above said driveway in the lowered position and in the raised position; and a power mechanism being at least partially recessed within said driveway; and a drive mechanism interconnecting said power mechanism with said chock, wherein said drive mechanism is positioned above said driveway.

12. A loading dock as claimed in claim 11, further comprising a base frame positioned on said driveway, wherein said chock is positioned for movement over said base frame, and wherein said drive mechanism is at least partially positioned within said base frame such that wheels of a vehicle positioned at said loading dock will be positioned over at least a portion of said drive mechanism.

13. A loading dock as claimed in claim 11, wherein said drive mechanism includes a screw member, wherein said power mechanism includes a motor having an output shaft, and wherein said screw member is aligned with said output shaft.

14. A loading dock as claimed in claim 11, wherein said motor comprises an electric motor.

15. A loading dock as claimed in claim 11, wherein said power mechanism is spaced from said dock face.

16. A loading dock as claimed in claim 11, further comprising a housing in which said power mechanism is positioned.

17. A loading dock as claimed in claim 16, wherein said housing is spaced from said dock face.

18. A loading dock as claimed in claim 16, wherein said housing includes a ramped portion facing said dock face.

\* \* \* \* \*